(12) United States Patent
Putnam, Jr.

(10) Patent No.: US 6,679,537 B1
(45) Date of Patent: Jan. 20, 2004

(54) MOTORCYCLE WINDSHIELD STORAGE WALL BRACKET

(76) Inventor: Richard D. Putnam, Jr., 20 Stowe Rd., Grafton, MA (US) 01519

( * ) Notice: Subject to any disclaimer, the term of this patent is extended or adjusted under 35 U.S.C. 154(b) by 0 days.

(21) Appl. No.: 10/337,306

(22) Filed: Jan. 7, 2003

(51) Int. Cl.[7] .................................................. B60J 1/00
(52) U.S. Cl. ................ 296/78.1; 296/77.1; 248/231.91; 211/5; 211/18; 211/41.14
(58) Field of Search ............................... 296/77.1, 78.1; 248/201, 207, 218.4, 220.21, 221.11, 222.14, 223.31, 231.91, 282.1, 284.1; 211/5, 17, 18, 41.14, 105.1

(56) References Cited

U.S. PATENT DOCUMENTS

| | | |
|---|---|---|
| 4,093,251 A | 6/1978 | Boyer |
| 5,465,883 A | 11/1995 | Woodward |
| 5,658,035 A | 8/1997 | Armstrong |
| D431,804 S | 10/2000 | Willey |
| 6,247,601 B1 | 6/2001 | Norton et al. |
| 6,254,166 B1 | 7/2001 | Willey |

*Primary Examiner*—Stephen T. Gordon
*Assistant Examiner*—H. Gutman
(74) *Attorney, Agent, or Firm*—Richard C. Litman

(57) ABSTRACT

A motorcycle windshield storage wall bracket for holding a removable motorcycle windshield is provided. The storage wall bracket has two elongated main frames, each elongated main frame having opposing ends that are extended perpendicular to the longitudinal axis of the longitudinal main frame and which can accept the side pieces. The side pieces are attached to the ends utilizing nut and bolt assemblies. Between the side pieces and the ends of the main frames are rubber grommets. The removable motorcycle windshield is clipped onto the rubber grommets of the storage wall bracket and thereby is stored in a secure manner.

3 Claims, 2 Drawing Sheets

MOTORCYCLE WINDSHIELD STORAGE WALL BRACKET

BACKGROUND OF THE INVENTION

1. Field of the Invention

The present invention relates to wall brackets, and particularly to a motorcycle windshield storage wall bracket that is utilized to store removable motorcycle windshields to prevent damage.

2. Description of the Related Art

The handling and storage of glass items must be done in a gentle and careful manner. U.S. Pat. No. 4,093,251, issued to Boyer, U.S. Pat. No. 5,465,883, issued to Woodward and U.S. Pat. No. 6,247,602, issued to Norton et al. appear to be drawn to the handling of automotive windshields, not to motorcycle windshields. Different types of removable windshields are known in the art. Examples of these are U.S. Design Pat. No. 431,804, issued to Willey, U.S. Pat. No. 5,658,035, issued to Armstrong, and U.S. Pat. No. 6,254,155, issued to Willey.

None of the above inventions and patents, taken either singularly or in combination, is seen to describe the instant invention as claimed. Thus, a motorcycle windshield storage wall bracket solving the aforementioned problems is desired.

SUMMARY OF THE INVENTION

The present invention is a windshield storage wall bracket that is fastened to the wall to help keep the windshield secure. The wall bracket has two main frames that have bent ends that allow side pieces to be attached. The side pieces hold rubber grommets in place utilizing nut and bolt assemblies. The windshield is simply placed over the grommets, securing the windshield in place.

Accordingly, it is a principal object of the invention to prevent a removable motorcycle windshield from damage during storage by providing a wall bracket which keeps the windshield high and off the floor.

It is another object of the invention to utilize the mechanism that attaches the windshield to the motorcycle to attach it to a storage wall bracket.

It is a further object of the invention to provide a motorcycle windshield storage bracket which is securely mounted to a wall.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
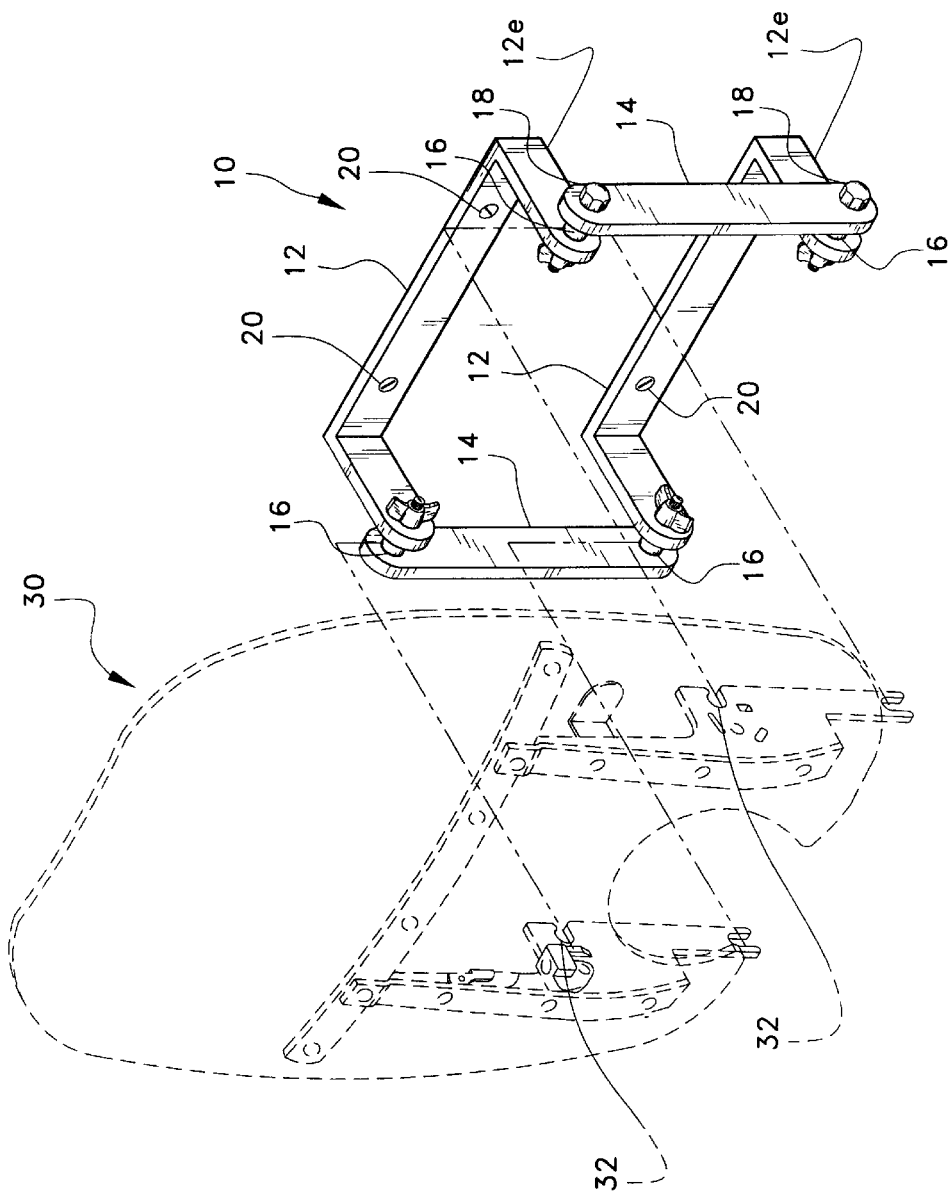
FIG. 1 is an environmental, perspective view of a motorcycle windshield storage wall bracket according to the present invention.
Figure 2:
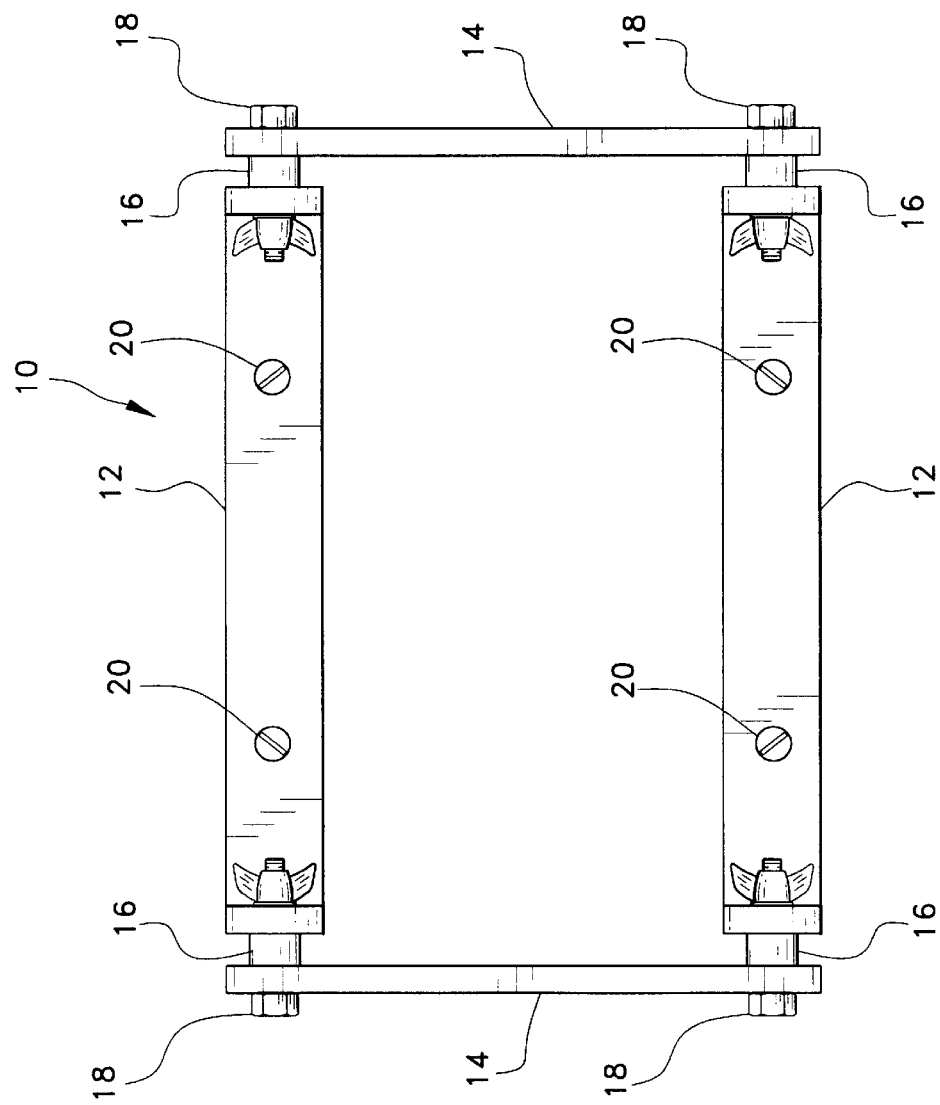
FIG. 2 is a front view of a motorcycle windshield storage wall bracket.

The present invention is drawn to a windshield storage wall bracket 10 that holds a removable motorcycle windshield 30. The wall bracket 10 has two elongated main wall frames 12. Each main wall frame 12 is a flat bar having ends 12e that extend perpendicular to the longitudinal axis of the main wall frame 12, preferably by bending the ends of the bar, and which can accept the side piece 14. The side pieces 14 are flat bars attached to the ends 12e of the main wall frames 12 by a nut and bolt assembly 18. In the drawings, a wing nut and bolt assembly 18 is utilized.

Between the side pieces 14 and the ends 12e, rubber grommets 16 are placed to allow the attachment panels 32 of the windshield 30 to be securely attached to the wall bracket 10. The rubber grommets 16 are held in place by the nut and bolt assemblies 18 passing therethrough. The rubber grommets 16 are sized according to the size needed to attach the removable windshield 30. The wall bracket 10 is attached to the wall utilizing fasteners 20 to attach the main wall frames 12 to the wall. The type of fasteners 20 used with the wall bracket 10 depend on the type of material that the wall is constructed from, i.e., concrete, brick or dry wall.

The side pieces 14 and the elongated main wall frames 12 with the ends 12e can be made of metal, preferably flat bar mild steel. As shown in FIG. 1, the attachment panels 32 of the removable windshield 30 are simply clipped over the rubber grommets 16 that are held between the bent ends 12e and the side pieces 14. The main wall frames 12 can have hooks so that a helmet can be hung and stored.

It is to be understood that the present invention is not limited to the embodiment described above, but encompasses any and all embodiments within the scope of the following claims.

I claim:

1. A motorcycle windshield storage wall bracket, comprising:

a first elongated main wall frame and a second elongated main wall frame, each said elongated main wall frame having opposing first and second ends extending perpendicular to the longitudinal axis of the elongated main wall frame, the elongated main wall frames being adapted for attachment to a wall in spaced apart relation;

a first side piece attached to the first ends of the first and second elongated main wall frames and a second side piece attached to the second ends of the first and second elongated main wall frames; and a rubber grommet extending between each of the side pieces and each of the opposing ends of the main wall frames, said rubber grommets being tubular;

a nut and bolt assembly securing each of the rubber grommets between the side piece and the opposing end of the main wall frame and passing through said rubber grommet, said rubber grommets being adapted for receiving a removable motorcycle windshield retainer bracket clipped thereto.

2. The motorcycle windshield storage wall bracket of claim 1, wherein the nut and bolt assembly comprises a wing nut and a bolt receiving the wing nut.

3. The motorcycle windshield storage wall bracket of claim 1, wherein the first and second elongated main wall frames and the side pieces are made of metal.

* * * * *